United States Patent
Fogh-Hansen

(10) Patent No.: US 9,283,744 B2
(45) Date of Patent: Mar. 15, 2016

(54) GASKET FOR A DOCTOR BLADE CHAMBER

(75) Inventor: Christian Fogh-Hansen, Bjert (DK)

(73) Assignee: Tresu A/S, Bjert (DK)

( * ) Notice: Subject to any disclaimer, the term of this patent is extended or adjusted under 35 U.S.C. 154(b) by 0 days.

(21) Appl. No.: 14/238,236

(22) PCT Filed: Aug. 13, 2012

(86) PCT No.: PCT/DK2012/050293
§ 371 (c)(1),
(2), (4) Date: May 20, 2014

(87) PCT Pub. No.: WO2013/020560
PCT Pub. Date: Feb. 14, 2013

(65) Prior Publication Data
US 2014/0261033 A1    Sep. 18, 2014

(30) Foreign Application Priority Data

Aug. 11, 2011 (DK) .................................. 2011 70442

(51) Int. Cl.
*B41F 31/02* (2006.01)
*B41F 31/04* (2006.01)
*F16J 15/32* (2006.01)

(52) U.S. Cl.
CPC .............. *B41F 31/04* (2013.01); *B41F 31/027* (2013.01); *F16J 15/3232* (2013.01)

(58) Field of Classification Search
CPC ........ B41F 9/1063; B41F 9/065; B41F 9/068; B41F 31/027; B41F 31/02; F16J 15/3232; F16J 15/3204; F16J 15/32
See application file for complete search history.

(56) References Cited

U.S. PATENT DOCUMENTS

| 4,581,995 | A | 4/1986 | Stone |
| 6,739,248 | B2 * | 5/2004 | Kolbe et al. ................... 101/169 |
| 6,832,551 | B2 | 12/2004 | Jendroska et al. |
| 7,597,761 | B2 * | 10/2009 | Van Denend ................. 118/410 |
| 2003/0121435 | A1 | 7/2003 | Jendroska et al. |
| 2011/0056395 | A1 | 3/2011 | Gydesen et al. |
| 2011/0219968 | A1 | 9/2011 | Fogh-Hansen |

FOREIGN PATENT DOCUMENTS

| CN | 201058513 Y | 5/2008 |
| EP | 0 941 846 A1 | 9/1999 |
| WO | 89/07047 A1 | 8/1989 |
| WO | 2009/024151 A1 | 2/2009 |
| WO | 2010/060433 A1 | 6/2010 |

* cited by examiner

*Primary Examiner* — Matthew G Marini
*Assistant Examiner* — Leo T Hinze
(74) *Attorney, Agent, or Firm* — Roberts Mlotkowski Safran & Cole, PC; David S. Safran

(57) ABSTRACT

For sealing between a doctor blade chamber (3) and a rotatable roller (16, 23) in a printing unit, there is provided a gasket (4) having an elastomeric edge (17, 18) for sealing abutment against the roller. The gasket includes a rigid/supporting rail (7) which during operational conditions of the printing unit bears against the roller together with the elastomeric edge or which is spaced apart from the roller.

20 Claims, 4 Drawing Sheets

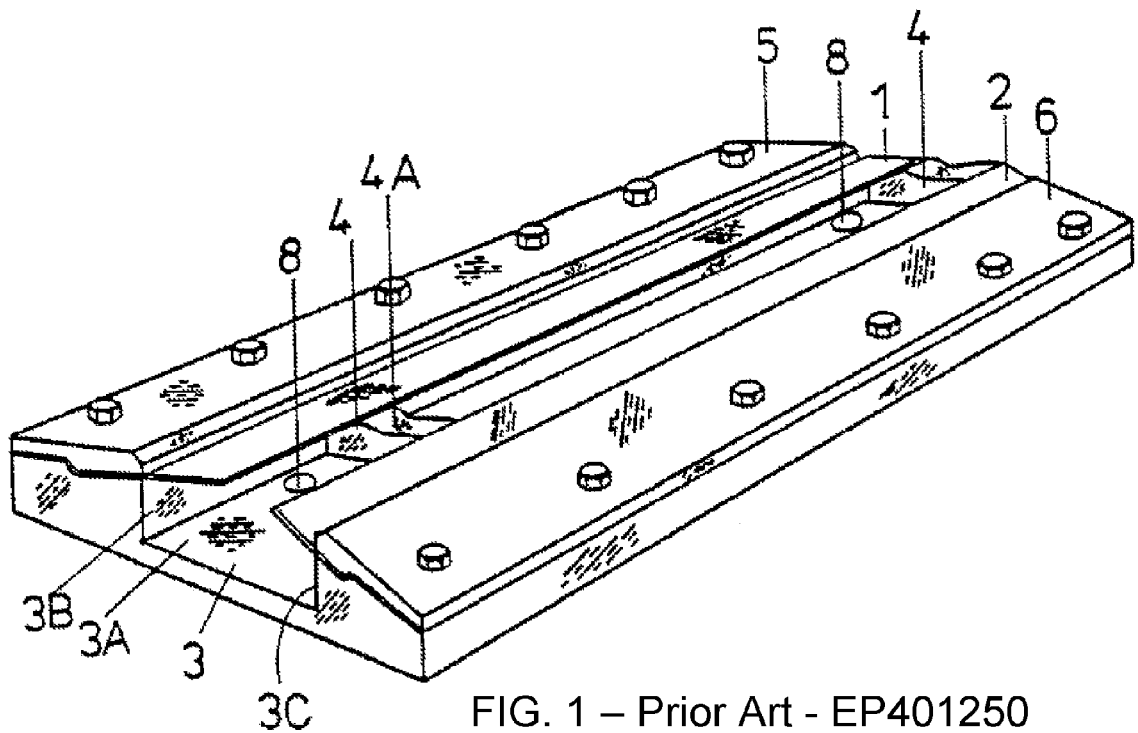
FIG. 1 – Prior Art - EP401250
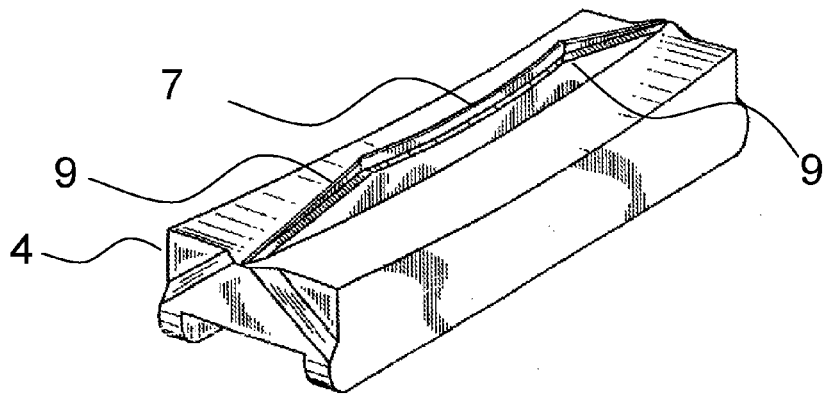
FIG. 2 – Prior Art – US D 488,503

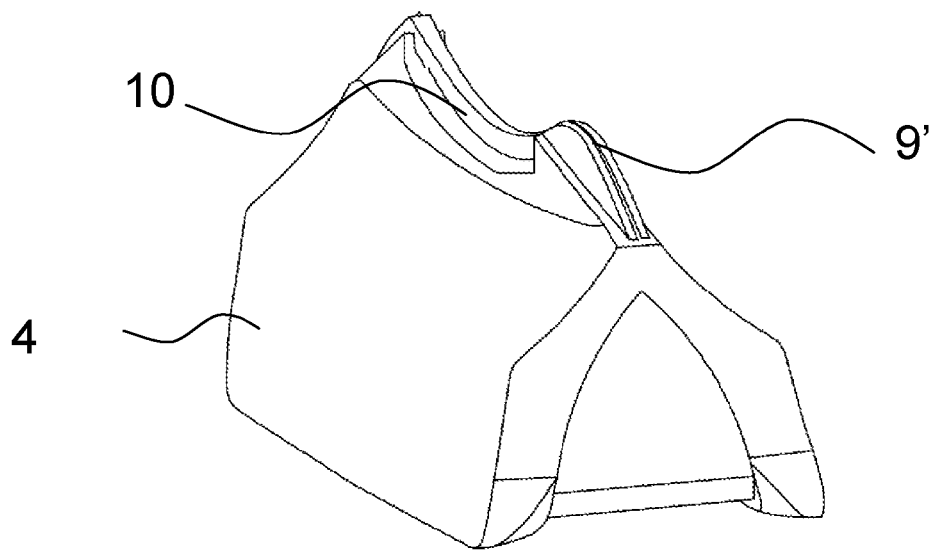
FIG. 3a – Prior Art – WO2010/060433
perspective view
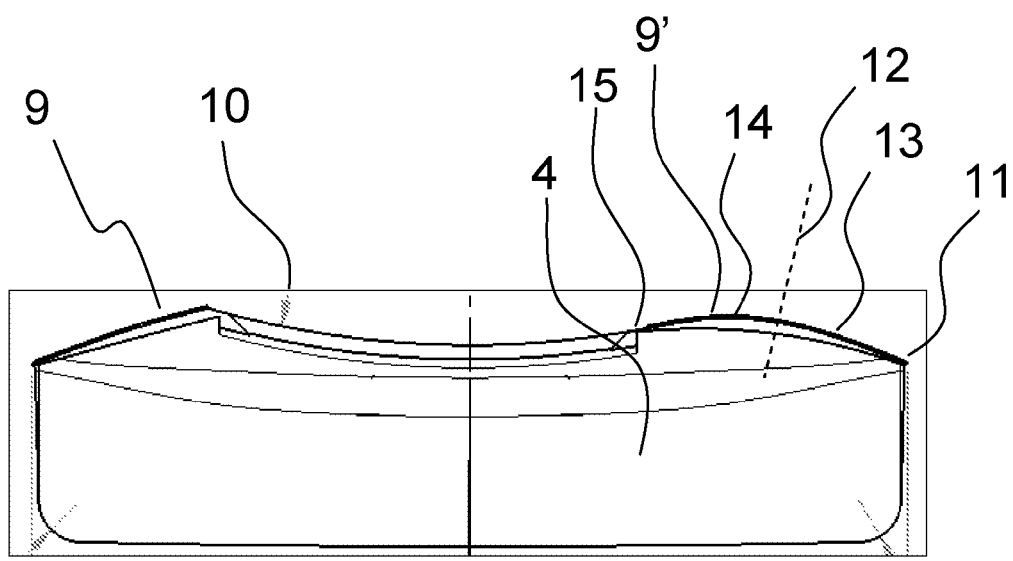
FIG. 3b – Prior Art – WO2010/060433
side view

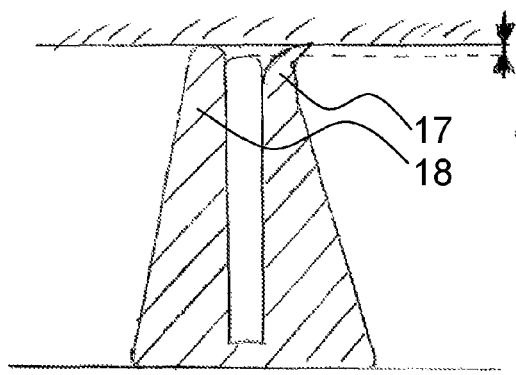
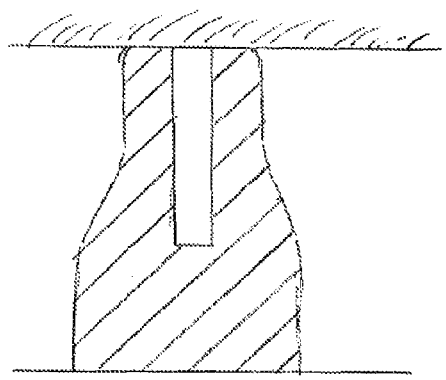
FIG. 6a
FIG. 6b
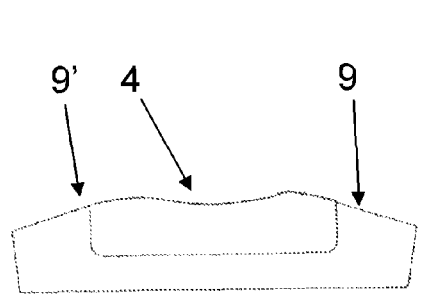
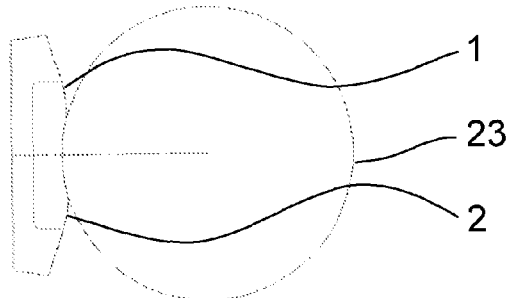
FIG. 7a
FIG. 7b
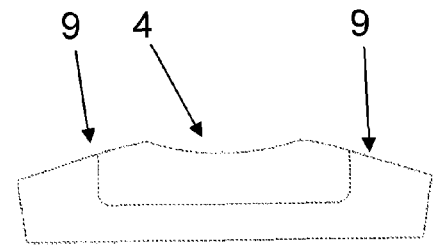
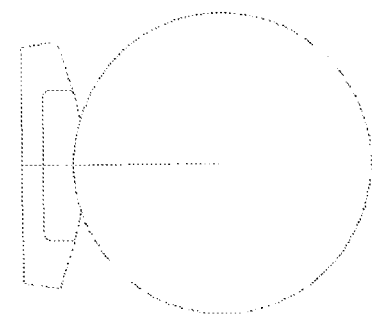
FIG. 8a
FIG. 8b

GASKET FOR A DOCTOR BLADE CHAMBER

BACKGROUND OF THE INVENTION

1. Field of the Invention

The present invention concerns a printing unit and a gasket wherein the printing unit has a doctor blade chamber and a rotatable roller, the roller extending partially into the doctor blade chamber for receiving ink from the doctor blade chamber during operation. For this is provided a gasket for sealing between the doctor blade chamber and the roller, where the gasket at one side has a sealing surface for sealing abutment against a bottom of the doctor blade chamber, and where the gasket a side opposite the sealing surface has an elastomeric edge for sealing abutment against the roller.

2. Description of Related Art

A rotary printing unit for colour printing on printed matter typically comprises a semi-open doctor blade chamber with ink which is transferred to a screen roller in that the screen roller while rotating runs with part of its surface submerged in the ink bath in the doctor blade chamber. In order to seal the semi-open chamber towards the ink roller, the doctor blade chamber is connected with a doctor blade bearing on the roller. The ends of the doctor blade chamber are sealed with rubber gaskets which are embedded in the doctor blade chamber with their bottoms and which have a curving top side in contact with the roller. Such rubber gaskets can also be used for dividing the doctor blade chamber into several sections with ink baths.

In European Patent Application EP 401 250, which corresponds to International Patent Application Publication WO 89/07047 A1, is disclosed a doctor blade device which is represented in FIG. 1. The device includes a chamber bar with a U-shaped doctor blade chamber 3 with bottom 3A and sides 3B and 3C which during operation contain ink for a printing unit with a screen roller (not shown) which is in contact with the ink in the chamber 3. Two doctor blades 1, 2 are clamped to the chamber 3 by rails 5, 6, having the function of sealing against the screen roller, its surface being in contact with the ink in the chamber 3. Ink can be conducted into the chamber 3 via channels 8. Two channels 8 are shown, one for each part chamber in the chamber 3, wherein the part chambers are provided by delimitation by means of a packing 4 inside the chamber and a packing 4 at the end of the chamber. The packing 4 has a concave shape 4A for bearing against the screen roller.

A packing of this type is reproduced in FIG. 2 which is a copy of the U.S. Design Pat. D 488,503. This packing has a central section 10 with a sharp rail 7 of a hard material for bearing against the screen roller for enhanced sealing. Packings or gaskets with rails for bearing against the screen roller are also described in International Patent Application Publication WO 2009/024151.

Various embodiments of supports for doctor blades have been attempted as well, for example straight edges 9 as shown in FIG. 2, or combinations of a straight edge 9 and a curving edge 9' at each their end of the central section 10 as shown on FIGS. 3a and 3b. The second lip 9' curves in against the central section 10, where at the transition point 15 it has tangential direction relative to the screen roller in order to support tangential contact of the sealing doctor blade on the rotary roller. The curvature of the lip 9' is increased from the outer edge 11 where the sealing doctor blade leaves the holder, in direction against the central section 10. With reference to the auxiliary line 12, it appears that the curvature actually changes such that the curvature is lesser in the second half 14 of the lip 9' than in the first half 13 of the lip 9'. A further improvement of the course of the doctor blade is described in International Patent Application Publication WO 2010/060433 where the sealing doctor blade is elastically deformed into an arch with a curvature which is greater at the holder than at the contact area on the rotary roller.

In general, long life of the sealing and the tightness between the doctor blade chamber and the roller are important aspects and subject to continuous improvement; and as it appears from the above description of prior art there are various initiatives with regard to the course of the doctor blade as well as to the design of the gaskets. For example, it is desirable with improved durability of the gaskets. Even though the above described hard rails in the gaskets/packing are an improvement compared with the prior art, these gaskets have the drawback that the colour pigments are wearing considerably on the hard rails. Making these rails harder may reduce wear but implies a risk of more rapid wear on the screen roller at the line of contact with the rail.

SUMMARY OF THE INVENTION

Therefore, it is the object of the invention to provide an improvement on this technical area. In particular, it is the object to provide an improved gasket for sealing between the doctor blade chamber and the screen roller, particularly with regard to durability.

This object is achieved by a printing unit and a gasket of the type described below.

The printing unit according to the invention is provided with a doctor blade chamber and a rotatable roller, the rotating surface of the roller extending partially into the doctor blade chamber for receiving ink from the doctor blade chamber during operation. There is provided a gasket for sealing between the doctor blade chamber and the roller, where the gasket at one side has a sealing surface for sealing abutment against a bottom of the doctor blade chamber, and where the gasket at a side opposite the sealing surface has an elastomeric edge for sealing abutment against the roller. The gasket is constituted by a gasket in the form of a single unit. The gasket furthermore includes an embedded rigid and supporting rail. In some embodiments, this embedded rigid and supporting rail bears against the roller together with the elastomeric edge under operational conditions of the printing unit. Alternatively, under operational conditions the rail is spaced apart from the roller, and only the elastomeric edge is bearing against the roller. This means that the elastomeric edge is supported by the rail, either right up to the roller or supported until a short distance from the roller, for example a spacing between 0 and 7 mm, but preferably with a spacing between 0 and 3 mm between the roller and the rail.

The rigid/supporting rail is fixed to the elastomeric edge, e.g., by gluing or chemical bonding. The fact that a fixation is provided to the rigid/supporting rail and the elastomeric edge means that a perfect gasket is achieved, with optimal sealing and optimal fit in relation to the roller in the printing unit.

For the sake of good order it is to be mentioned that the rigid/supporting rail does not necessarily need to extend along the entire length of the gasket but may only extend along a part or some parts thereof.

Surprisingly, it has appeared that such a gasket compared with a gasket according to prior art, e.g., as described in International Patent Application Publication WO 2009/024151, has about twice as long service life. In comparison it can be mentioned that gaskets of mutually similar types have a service life of two hours by a gasket with rubber edge against the roller where the rubber edge was not supported by a rigid rail;

a service life of 16 hours by a gasket with a sharp edge as disclosed in International Patent Application Publication WO 2009/024151; and a service life of 35 hours by a gasket with a rail-supported rubber edge according to the invention.

Also, it has appeared that a gasket in the form of a single unit and with the rail supported elastomeric edge is particularly useful by printing units with high rotational speeds of the roller, e.g., by a tangential speed of 500 to 800 m/min, favorizing this type of gasket particularly by high-speed production. Due to the longer service life and the consequent fewer pauses in which gaskets are to be replaced, the gasket according to the invention is an improvement with regard to production efficiency.

The term "rigid rail" means that the rail as compared with the elastomer is made of a stiffer material which thus can exert a supporting action on the softer elastomeric edge/rubber edge. Typically, such a rail would be provided as a flat profile which is substantially perpendicular to the sealing surface and the bottom of the doctor blade chamber. Usable materials for the rail include among others metal, e.g., copper, and hard polymers, e.g., polyurethane, polyethylene, polyoxymethylene (POM) or combinations thereof. Such polymers may furthermore be reinforced by e.g., glass fibres or carbon fibres.

In principle, the rigid rail can be made of the same material as the elastomeric edge itself, however with the difference that the rigidity is different in the two parts. This may possibly be achieved by a suitable treatment of one of the two parts. Furthermore, the rigid rail can be adapted such that after a given operational time in contact with the roller it is worn to fit, so to say, thereby achieving a perfect adapted shape in relation to the roller. In this way is achieved the most optimal fit between a gasket and the roller.

In a preferred variant of a gasket according to the invention, the gasket is made such that between the rigid and supporting rail and the softer elastomeric edge there is a stable joint; the rail and the elastomeric edge may e.g., be chemically connected or mutually attached in another secure and strong way.

The term elastomeric edge" implies that it is the edge of an elastomeric material which bears against the roller as a sealing means. This is in contrast to International Patent Application Publication WO 2009/024151 where the sharp rigid rail bears against the roller and has the sealing function. Rubber or synthetic elastomeric materials can advantageously be used as elastomer.

The gasket itself has a body with a sealing surface for sealing abutment against a bottom in the doctor blade chamber, and at a side opposite the sealing surface the gasket includes an elastomeric edge for sealing abutment against the roller and a rigid rail for supporting the elastomeric edge. The rail is embedded in the body and extends out from the body. It is possible with an elastomeric edge at one side of the rail only, and it is also possible with an elastomeric edge at both sides of the rail. If a single elastomeric edge is used for bearing on the roller it is advantageous if it is arranged at the side of the rail facing the ink bath of the doctor blade chamber. By having two identical elastomeric edges at each their side of the rail there is no need to consider a preferred orientation of the gasket relative to the doctor blade chamber, thus facilitating installation for the user and minimizing the risk of erroneous installation.

In order to achieve the spacing between the rail and the roller, in some embodiments the gasket is provided with a rail having a distance from the elastomeric edge such that the elastomeric edge projects farther out from the body than the rail, e.g., a distance between 0 and 7 mm, but preferably a distance between 0 and 3 mm. Depending on many different conditions there may be reasons to have an elastomeric edge that is flush with the rigid edge, whereas other conditions can entail that a distance of up to 7 mm is more advantageous.

However, it is to be mentioned that a possible spacing between the elastomeric edge and the rail is reduced when the gasket is pressed against the roller and the elastomeric edge is deformed thereby. Depending on this pressure and the hardness and shape of the elastomeric edge, this spacing will be more or less reduced, e.g., so much that not only the elastomeric edge is bearing on the roller but the rail will come into contact as well.

Optionally, the gasket includes a first elastomeric lip extending up along one side of the rail and bearing against the roller during operation in order thereby to constitute the elastomeric edge. This means that the elastomeric lip projects farther out than the rail or is flush with the rail. If projecting farther out from the body than the rail, deformation of the lip when being pressed against the roller will either mean only so much deformation that a spacing between the rail and roller still remains, or so much more deformation that also the rail will come into contact with the roller. For example, the elastomeric lip projects farther out from the body than the rail at a distance between 0 mm and 7 mm, but preferably between 0 mm and 3 mm between the elastomeric edge and the rail.

Optionally, the gasket also includes a second elastomeric lip extending up along the opposite side of the rail. In further embodiments, the first elastomeric lip and a second elastomeric lip extend to various distances from the sealing surface at the bottom of the doctor blade chamber. The elastomeric lips may e.g., have different dimensions so that only the first but not the second elastomeric lip bears against the roller during operation.

Since the elastomeric lips are supported by the rail they can be designed relatively thin which is an advantage at high speeds of the roller, as a thin elastomeric lip has less friction than a thick elastomeric lip. Advantageous thicknesses of such thin elastomeric lips are less than 2 mm, for example between 4 and 14 tenths of a millimeter.

Since the elastomeric edge is the element primarily having the sealing function irrespective of the rail bearing against the roller or not during operation, there is no need for the rail being sharp as described in International Patent Application Publication WO 2009/024151. In further embodiments the rail is therefore blunt. In line with the embodiments in International Patent Application Publication WO 2009/024151, the rail can be broken into sections in order to be bent resiliently under load by pressure action in spite of its orientation in parallel with pressing action.

In order to follow the curvature on the roller, the elastomeric edge, e.g., the elastomeric lips, have a concave course. Correspondingly, it is advantageous if the rail also has a concave course regardless of the fact that the rail is not necessarily in contact with the roller.

In practice, the sealing is performed in the following way. A gasket is provided between a doctor blade chamber and a rotatable roller in a printing unit where the gasket at one side has a sealing surface for sealing abutment against a bottom in the doctor blade chamber and placed in the doctor blade chamber in an appropriate way as well. The gasket is additionally provided at one side opposite the sealing surface with an elastomeric edge for sealing abutment against the roller and a rigid rail for supporting the elastomeric edge. The rail is embedded in the body and extends out from the body. The rail has a distance from the elastomeric edge such that the elastomeric edge projects farther out from the body than the rail, e.g., a distance between 0 and 7 mm, but preferably a distance between 0 and 3 mm. The gasket is then brought in contact with the elastomeric edge, deforming the latter. The deformation can be so large that the rail also comes into contact with the rollers, but may alternatively be chosen such that the rail does not come into contact but has a small distance to the roller, e.g., between 0 and 7 mm, or maybe only between 0 and 3 mm, which has appeared to be optimal. The distance can also be greater, but in practice it has appeared that a relatively good and optimal support is achieved by distances up to 3 mm. If the gasket is provided with an elastomeric edge at one side of the rail only, the gasket is advantageously fitted with this elastomeric edge between the ink bath and the rail.

Practical experiments have shown that if the supporting rail and the elastomeric edge are at the same level, the best sealing and the longest service life for the gasket are achieved. Different types of ink, rollers, roller speeds, or other parameters may, however, have influence on these conditions. Thus there may be conditions that entail that it is more optimal with a slightly retracted supporting rail relative to the elastomeric edge.

By indications of distances/spacings as intervals between a first value and a second value, the end points of the intervals are included unless other is explicitly indicated. Reference numbers with reference to the drawings in the claims are not restrictive for the invention.

BRIEF DESCRIPTION OF THE DRAWINGS

FIG. 1 is a perspective view of a doctor blade chamber according to prior art as illustrated in EP 401250;

FIG. 2 is a perspective view of a gasket according to prior art as illustrated in USD 488503;

FIG. 3*a* is a perspective view of a gasket according to prior art as illustrated in WO 2010/060433 and 3*b*) is a side view thereof;

FIG. 6*a* is a cross-sectional views of an alternative embodiment with both lips longer than the rail;

FIG. 6*b* is a cross-sectional views of an alternative embodiment with both lips pressed against the roller to such a degree that the rail touches the roller as well;

FIG. 7*a* schematically shows a gasket and FIG. 7*b* shows the gasket bearing against the roller;

FIG. 8*a* schematically shows an alternative gasket and FIG. 8*b* shows the gasket bearing against the roller.

DETAILED DESCRIPTION OF THE INVENTION

FIGS. 1, 2 and 3 are described as prior art in the introduction.

Figure 4:
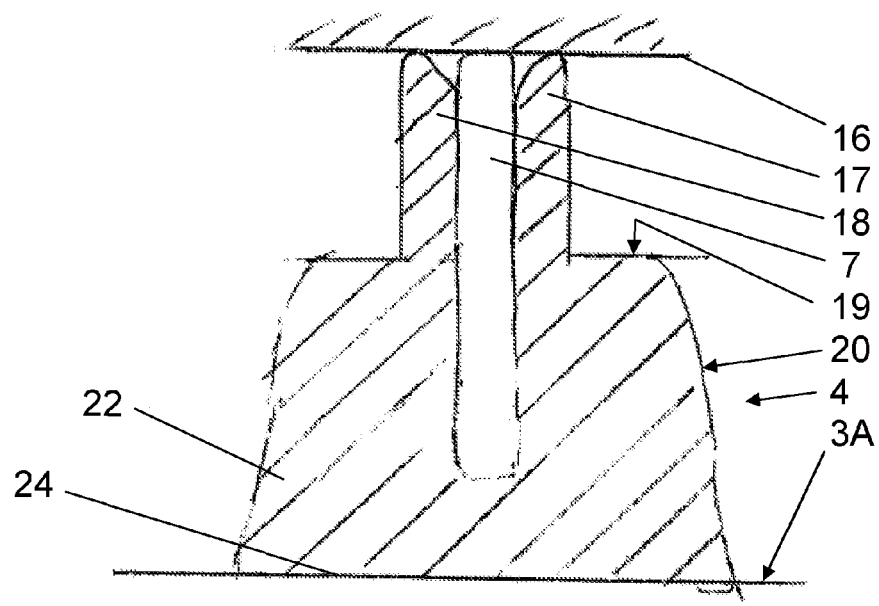
FIG. 4 is a cross-sectional view of a gasket according to the invention.

FIG. 4 illustrates a gasket 4 according to the invention. The gasket has an elastomeric body 22 with a sealing surface 24 resting sealingly against the bottom 3A of the doctor blade chamber. The side beads 20 and the shoulders 19 and possible embedded stabilizing ribs provide a stable structure of the gasket in which a rail 7 is embedded. At each their side of the rail 7, a pair of elastomeric lips 17, 18 extend from the body and to the edge of the rail 7 such that both elastomeric lips 17, 8 and rail 7 are in contact with the roller surface 16. In order to achieve this, the elastomeric lips 17, 18 extend at least as far from the body 22 as the rail 7. The rail 7 provides support for the elastomeric lips 17, 18 such that the latter does not capsize under load. The two elastomeric lips may be identical which is practical with regard to mounting as then it is unnecessary to observe the orientation of the gasket relative to the direction of rotation or the longitudinal direction of the screen roller.

Figures 5A, 5B:
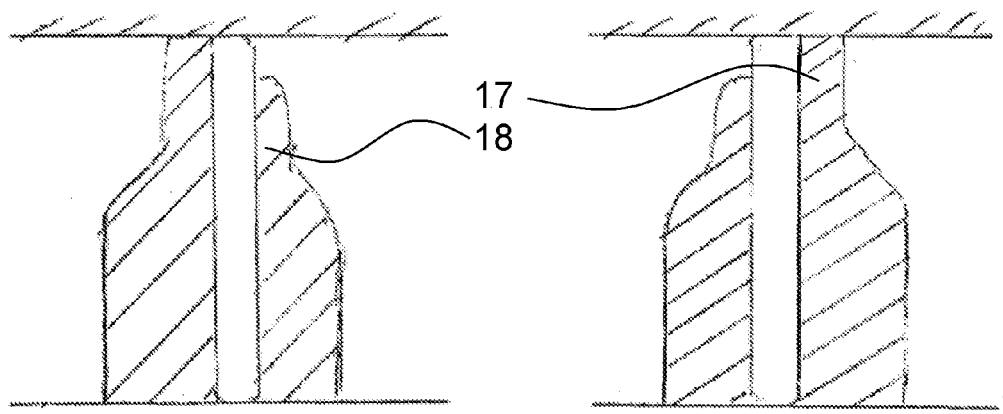
FIGS. 5*a* & 5*b* are cross-sectional views of an alternative embodiment with a longer rubber lip in FIG. 5*a*) and right side in FIG. 5*b*, respectively.

As illustrated in FIG. 5*a* and FIG. 5*b*, the two elastomeric lips 17, 18 can be designed with different lengths such that one of the lips 17, 18 is longer than the other. Depending on their design and length and the hardness of the elastomer, it may be advantageous to have a longer lip at the side facing in the same direction as the space in the doctor blade chamber where the ink is.

The elastomeric edges, either in the form of thin lips 17, 18 extending from the body 22 as shown on FIGS. 4 and 5, or as an extended part of the body 22 as shown on FIG. 6, can be designed with a length such that they project farther out than the rail 7, either at one side of the rail 7 or at the other side of the rail 7, or at both sides. On FIG. 6 is indicated a length of up to 3 mm as a non-limiting example. The two elastomeric edges 17, 18 can be designed identically as e.g., illustrated on FIGS. 4 and 6*b*, or they can be designed differently as e.g., illustrated on FIGS. 5 and 6*a*. Even if the elastomeric edges 17, 18 are designed identical, by abutment on the rotating roller 16 they would be differently deformed as one elastomeric edge 18 will be pressed against the rail 7 whereas the other 17 will be pressed away from the rail 7, a fact which can be allowed for during design and production of the gasket 4 in order to ensure optimal sealing during operation where the roller 16 is rotating.

In a further embodiment, the elastomeric edges, e.g., in the form of elastomeric lips 17, 18, project farther out from the body 22 than the rail 7 but are designed such that they are deformed to be flush with the rail 7 when the gasket 4 is mounted in the doctor blade chamber 3 and is pressed against the screen roller by the predetermined contact pressure. An example is illustrated in FIG. 7*b*.

FIG. 7*a* shows a gasket 4 according to the invention having a curving support 9' and a straight support 9 for the doctor blades. This is in line with the gasket according to rior art described in the introduction, also illustrated in FIG. 3*b*. The curving course may furthermore be designed as described in International Patent Application Publication WO 2010/060433 and corresponding U.S. Patent Application Publication 2011/219968

FIG. 7*b* shows the gasket 4 from FIG. 7*a* when operating with doctor blade 1, 2 bearing against the roller 23. FIGS. 8*a* and 8*b* show an alternative embodiment of a gasket 4 with a straight support 9 of the doctor blades 1, 2.

The specific cross-sectional embodiments of prior art, e.g., the cross-sectional design as illustrated on FIGS. 2 and 3*a*, may also find application for the gaskets according to the invention. Moreover, the gaskets can be designed in cross-section as shown in FIGS. 3-8 in WO 2009/024151 and corresponding U.S. Patent Application Publication 2011/056395, and with ribs as shown in FIG. 9 of the latter document.

What is claimed is:

1. A printing unit with a doctor blade chamber and a rotatable roller where the roller extends partially into the doctor blade chamber for receiving ink from the doctor blade chamber during operation, where a non-self-lubricating gasket is provided for sealing between the doctor blade chamber and the roller, where the gasket at one side has a sealing surface for sealing abutment against a bottom of the doctor blade chamber, and where the gasket at a side opposite the sealing surface has an elastomeric edge for sealing abutment against the roller, wherein the gasket is in the form of a single unit comprising an embedded rigid/supporting rail which during operational condition of the printing unit has a spacing between the rail and the roller of between 0 mm and 7 mm.

2. Printing unit according to claim 1, wherein, during operational condition of the printing unit, the rail bears against the roller together with the elastomeric edge.

3. Printing unit according to claim 1 wherein the elastomeric edge of the gasket includes a first elastomeric lip extending up along one side of the rail and which bears against the roller during operation in order thereby to constitute the elastomeric edge.

4. Printing unit according to claim 3, wherein the elastomeric edge of the gasket includes a second elastomeric lip extending up along the opposite side of the rail, and where the first and second elastomeric lips extend/reach out to different distances from the sealing surface at the bottom of the doctor blade chamber.

5. Printing unit according to claim 4, wherein only the first but not the second elastomeric lip bears against roller during operation.

6. A non-self-lubricating gasket for sealing between a doctor blade chamber and a rotatable roller in a printing unit, where the gasket has a body with a sealing surface for sealing abutment against a bottom of the doctor blade chamber, and where the gasket at a side opposite the sealing surface has an elastomeric edge for sealing abutment against the roller, wherein the gasket is in the form of a single unit comprising an embedded rigid/supporting rail for supporting the elastomeric edge, where the rigid/supporting rail is fixed to the elastomeric edge, and where the rail extends from the body and to the elastomeric edge.

7. Gasket according to claim 6, wherein the spacing between the rail and the elastomeric edge is between 0 mm and 7 mm.

8. Gasket according to claim 7, wherein the elastomeric edge of the gasket includes a first elastomeric lip extending up along one side of the rail in order to be supported by the rail, where the elastomeric edge of the gasket includes a second elastomeric lip extending up along the opposite side of the rail, and wherein at least one of the first and second elastomeric lips extends farther out from the body than the rail for a distance between 0 mm and 7 mm for forming the elastomeric edge.

9. Gasket according to claim 8, where the first and second elastomeric lips extend/reach out to different distances from the sealing surface.

10. Gasket according to claim 9, wherein only the first but not the second elastomeric lip projects farther out than the rail in order to form the elastomeric edge.

11. A printing unit with a doctor blade chamber and a rotatable roller where the roller extends partially into the doctor blade chamber for receiving ink from the doctor blade chamber during operation, where a non-self-lubricating gasket is provided for sealing between the doctor blade chamber and the roller, where the gasket at one side has a sealing surface for sealing abutment against a bottom of the doctor blade chamber, and where the gasket at a side opposite the sealing surface has an elastomeric edge for sealing abutment against the roller, wherein the gasket is in the form of a single unit comprising an embedded rigid/supporting rail, wherein the embedded rigid/supporting rail is between 0 mm and 7 mm from the roller during operation and where the rigid/supporting rail is fixed to the elastomeric edge by one of glue and chemical bonding.

12. Printing unit according to claim 11, wherein the rail is spaced apart from the roller.

13. Printing unit according to claim 11, wherein the elastomeric edge of the gasket includes a first elastomeric lip extending up along one side of the rail and which bears against the roller during operation in order thereby to constitute the elastomeric edge.

14. Printing unit according to claim 13, wherein the elastomeric edge of the gasket includes a second elastomeric lip extending up along the opposite side of the rail, and where the first and second elastomeric lips extend/reach out to different distances from the sealing surface at the bottom of the doctor blade chamber.

15. Printing unit according to claim 14, wherein only the first but not the second elastomeric lip bears against roller during operation.

16. A non-self-lubricating gasket for sealing between a doctor blade chamber and a rotatable roller in a printing unit, where the gasket has a body with a sealing surface for sealing abutment against a bottom of the doctor blade chamber, and where the gasket at a side opposite the sealing surface has an elastomeric edge for sealing abutment against the roller, wherein the gasket is in the form of a single unit comprising an embedded rigid/supporting rail for supporting the elastomeric edge, and wherein the embedded rigid/supporting rail is spaced apart from the elastomeric edge such that the elastomeric edge project farther from the body than the rail.

17. Gasket according to claim 16, wherein the spacing between the rail and the elastomeric edge is between 0 mm and 7 mm.

18. Gasket according to claim 17, wherein the elastomeric edge of the gasket includes a first elastomeric lip extending up along one side of the rail in order to be supported by the rail, where the elastomeric edge of the gasket includes a second elastomeric lip extending up along the opposite side of the rail, and wherein at least one of the first and second elastomeric lips extends farther out from the body than the rail for a distance of up to 7 mm for forming the elastomeric edge.

19. Gasket according to claim 18, where the first and second elastomeric lips extend/reach out to different distances from the sealing surface.

20. Gasket according to claim 19, wherein only the first but not the second elastomeric lip projects farther out than the rail in order to form the elastomeric edge.

* * * * *